Aug. 30, 1932.　　K. E. LYMAN　　1,875,065
BRAKE MECHANISM
Filed Aug. 22, 1927　　3 Sheets-Sheet 1
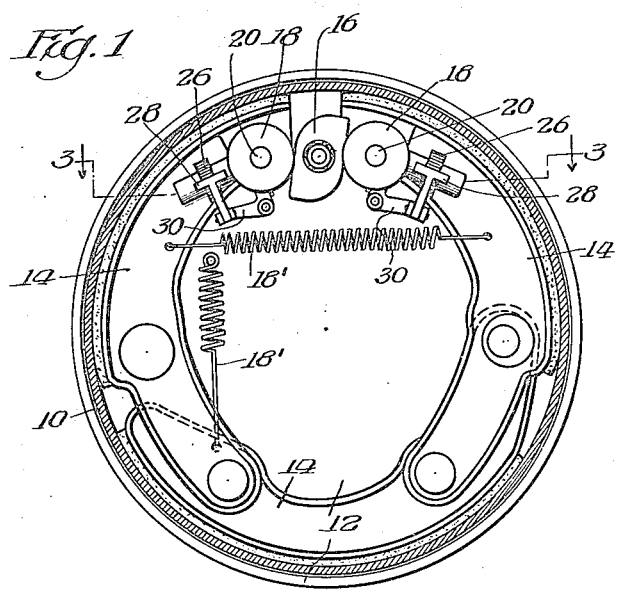
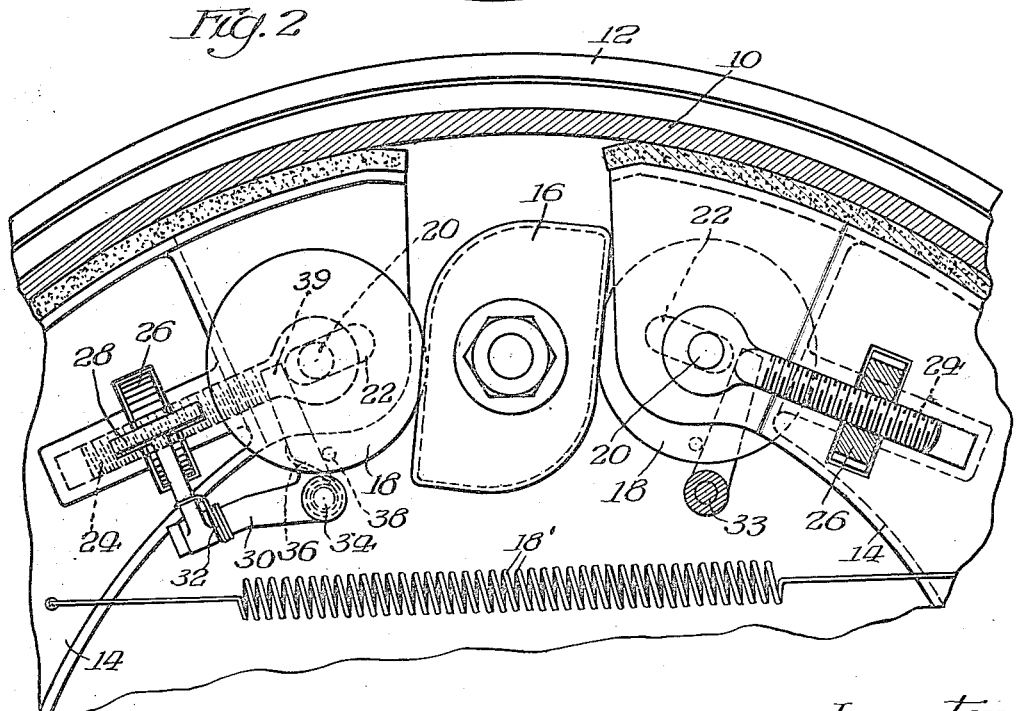
Inventor
KENNETH E. LYMAN

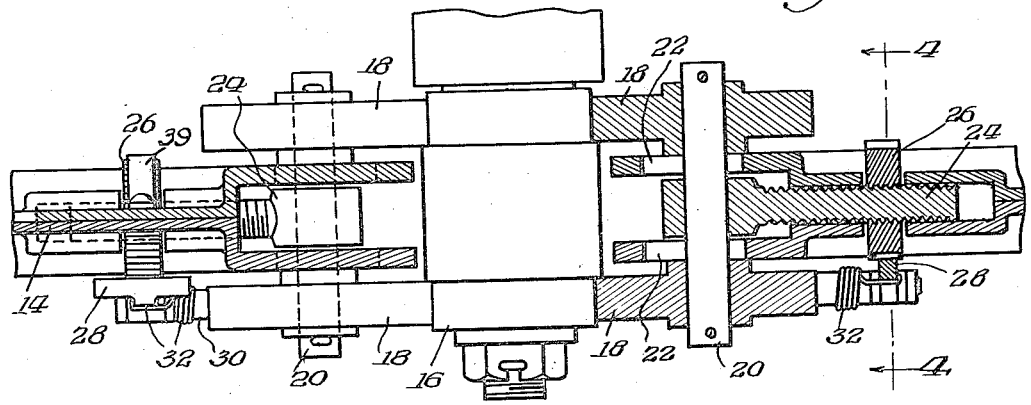
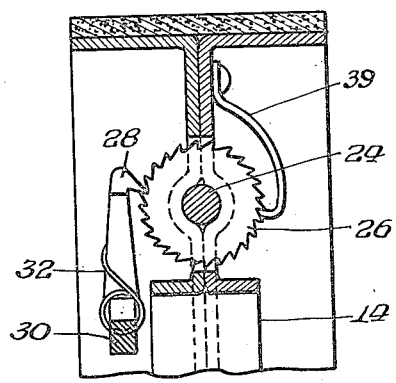
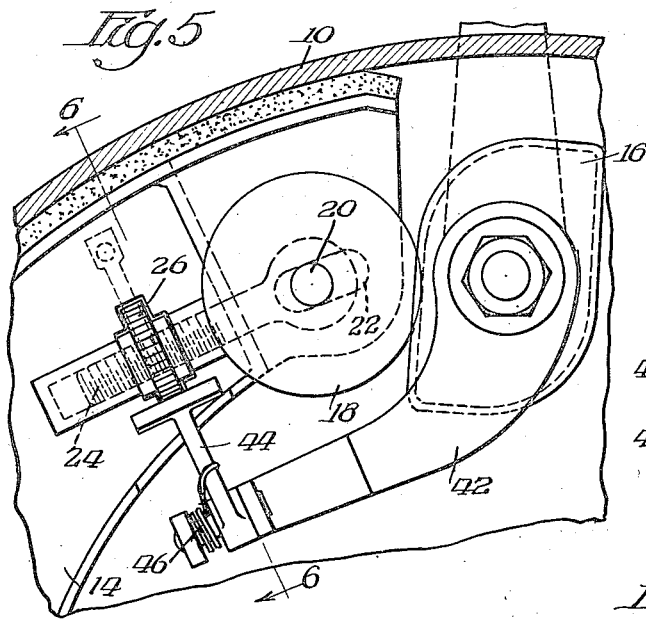
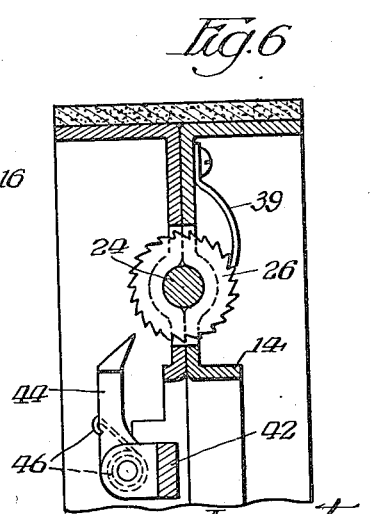

Aug. 30, 1932.                    K. E. LYMAN                    1,875,065
                                BRAKE MECHANISM
                           Filed Aug. 22, 1927          3 Sheets-Sheet 3
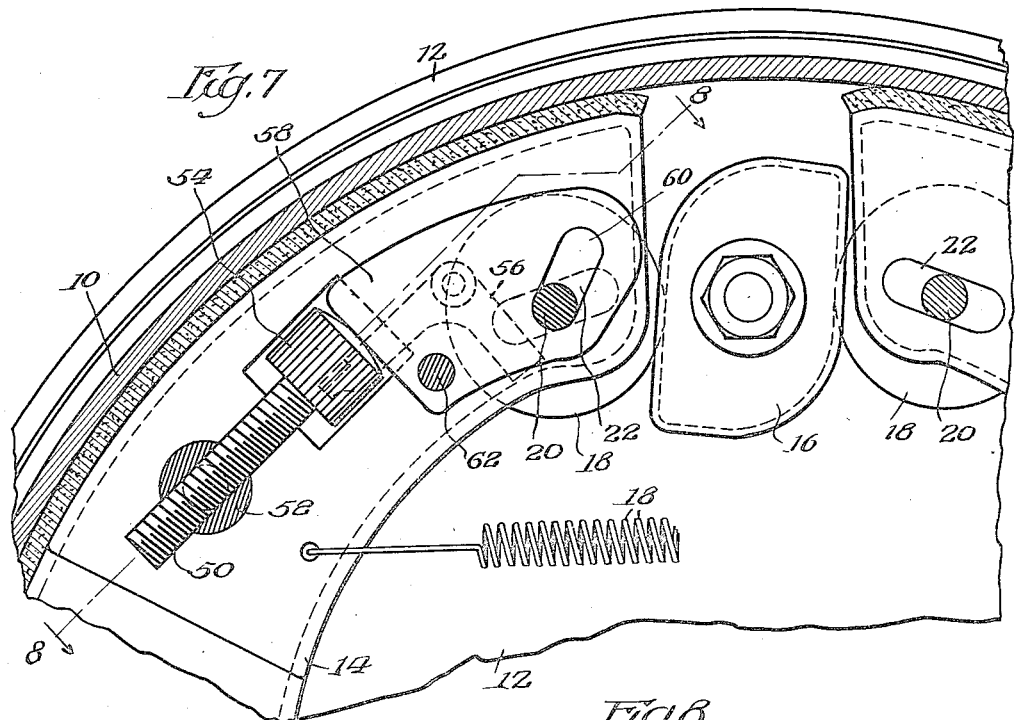
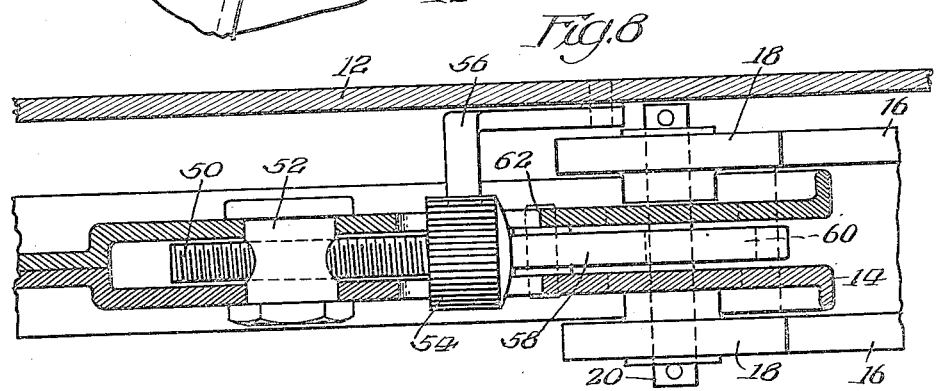
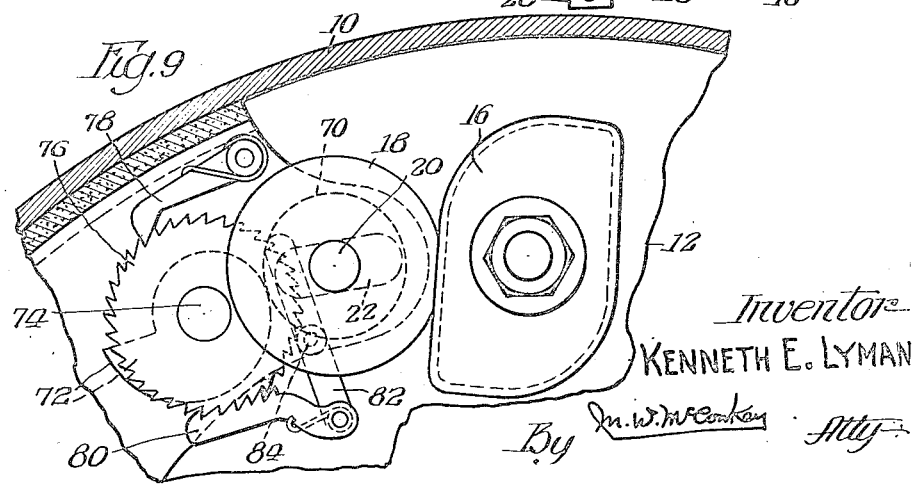
Inventor
KENNETH E. LYMAN
By M. W. McConkey  Atty Patented Aug. 30, 1932

1,875,065

UNITED STATES PATENT OFFICE

KENNETH E. LYMAN, OF CHICAGO, ILLINOIS, ASSIGNOR TO BENDIX BRAKE COMPANY, OF SOUTH BEND, INDIANA, A CORPORATION OF ILLINOIS

BRAKE MECHANISM

Application filed August 22, 1927. Serial No. 214,497.

This invention relates to brakes and is illustrated as embodied in an internal expanding automobile brake.

One feature of the invention relates to the provision of automatic means for adjusting a thrust member on a brake shoe or an equivalent friction device, by means of an angularly movable worm which is turned to cause the adjustment. Preferably the worm is operated by novel ratchet means operated by the application and release of the brake.

Another important feature of novelty relates to the operation of the adjusting device, whether or not of the type described above, by engagement with the thrust device, so that it will operate the same no matter how many times it has been adjusted.

The above and other objects and features of the invention, including various novel combinations of parts and desirable particular constructions, will be apparent from the following description of several illustrative embodiments shown in the accompany drawings, in which:

Figure 1 is a vertical section through the brake just inside the head of the brake drum and showing the brake shoes in side elevation;

Figure 2 is a view of an upper part of Figure 1 on a larger scale and partly broken away to show the adjusting mechanism;

Figure 3 is a section through the adjusting mechanism substantially on the line 3—3 of Figure 1;

Figure 4 is a section through one of the brake shoes on the line 4—4 of Figure 3;

Figure 5 is a view corresponding to part of Figure 2 but showing a different form of adjusting mechanism;

Figure 6 is a section through the shoe of Figure 5 substantially on the line 6—6 of Figure 5;

Figure 7 is a view corresponding to part of Figure 2 but showing a third modification;

Figure 8 is a section through the adjusting means of Figure 7 substantially on the line 8—8 of Figure 7; and Figure 9 is a view corresponding to part of Figure 2 and showing still a different modification of the adjusting mechanism.

The particular brake shown in Figure 1, and shown in part in the other figures, includes a rotatable drum 10 and a stationary backing plate or equivalent support 12, the friction means of the brake being shown as including shoes 14 applied by means such as a double cam 16 against the resistance of the usual return springs 18'. This brake is substantially as more fully described in Patent No. 1,567,716, granted Bendix Brake Company on December 29, 1925, on an application of A. Y. Dodge.

The present invention has to do primarily with the adjustment of the brake to compensate for wear. In the arrangement of Figures 1–4, the cam 16 or its equivalent acts on a thrust device preferably including rollers 18 on a spindle 20, each of the spindles 20 being arranged in slots 22 extending lengthwise of its shoe so that it is confined against movement crosswise of the shoe but may move lengthwise thereof.

Each spindle 20 in the modification of Figures 1–4 is provided with a thrust member 24 having a head mounted on the spindle and having a stem which is threaded to form a worm. Each of the worms 24 extends into a generally cylindrical recess in the web of the brake shoe formed by pressing registering semi-cylindrical grooves in the two stampings which are assembled to make up the shoe. A worm wheel 26 mounted on each of the worms 24 extends through openings in the sides of the shoe and is formed with ratchet teeth on its periphery for engagement with a pawl 28 mounted on a bell-crank lever 30 and urged by a spring 32 against the ratchet teeth of the member 26. The bell-crank lever 30 is mounted on a fixed pivot 34 on the backing plate 12 and is held by a spring 36 against a fixed stop 38 also on the backing plate, in such a position that its end 39 is in the path of movement of the corresponding spindle 20.

In operation, the application of the brake when it is worn causes the spindle 20 to engage the arm 39 of the bell-crank lever 30, thus causing the pawl 28 to move the ratchet 36 forward one tooth. When the brake is released, spring 36 returns the pawl into engagement with the next tooth. This operation causes the worm to move forward, carrying the rollers 18 with it, to increase the effective length of the shoe to compensate for the wear. A spring holding-pawl 40 may be provided to prevent reverse movement of the worm 24.

In the arrangement of Figures 5 and 6 the worm 24 and its worm wheel 26 formed with the ratchet teeth are substantially as described above. The operating mechanism, however, includes an arm 42 secured to and moving with the cam 16 and provided at its end with a pawl 44 held by a spring 46 against the ratchet teeth on the member 26. In the operation of this device the rocking of the cam further than usual, when the brake is worn, causes the pawl 44 to move member 26 forward one tooth, thus shifting the rollers when the brake is released as above described.

In the arrangement of Figures 7 and 8 the adjustment is by means of a worm 50 threaded into a cylindrical nut or thrust member 52 carried by the brake shoe, the worm 50 being provided with a ratchet wheel 54 operated by engagement with a pawl 56 in the form of a bell-crank lever pivoted on the backing plate 12 and having its opposite end in the path of movement of the spindle 20. The worm 50 disconnectedly engages a cam 58 pivoted at 62 and having an inclined cam slot 60 embracing the spindle 20. In the operation of this device, the engagement of the spindle 20 with the bell-crank lever 56, when the brake is worn, will cause the bell-crank lever to shift and the ratchet wheel 54 to turn the worm 50, thus rocking cam member 58 about its pivot 62 in such a direction that the cam slot 60 forces the spindle 20 forward, increasing the effective length of the shoe to compensate for the wear.

In the arrangement of Figure 9 the spindle 20 is mounted in a fitting 70 engaged by an edge cam 72 mounted on a spindle 74 carried by the brake shoe and provided with a ratchet wheel 76. The ratchet wheel 76 is engaged by a spring pressed holding-pawl 78, and by an operating pawl 80 spring-pressed against the ratchet member 76 and pivoted on the bottom of a lever 82 fulcrumed at 84 on the backing plate and having its upper end in the path of the spindle 20. As explained above, the engagement of the spindle 20 with the upper end of the lever 82 will shift the cam 72 to make the desired adjustment.

While a number of illustrative embodiments of the invention have been described in detail, it is not my intention to limit the scope of the invention to those particular embodiments or otherwise than by the terms of the appended claims.

I claim:

1. A brake friction member having at its end a pair of thrust rollers with a transverse spindle, in combination with a part engaging the spindle and extending lengthwise of said member and provided with an angularly-adjustable worm for shifting the rollers.

2. A brake element comprising two stampings spread apart to form spaced parallel arms at one end, and having registering pressed grooves jointly forming a recess between the stampings and opening between said arms.

3. A brake element comprising two stampings spread apart to form spaced parallel arms at one end, and having registering pressed grooves jointly forming a recess between the stampings and opening between said arms, said element being formed with an opening extending crosswise and intersecting said recess.

4. A brake element comprising, in combination, thrust roller means at one end, and threaded means for adjusting the position of the roller means lengthwise of said element.

5. A brake element comprising, in combination, thrust roller means at one end, and a threaded part engaging a threaded part having thrust engagement with said element for adjusting the position of the roller means lengthwise of said element.

6. A brake element comprising thrust means at one end of said element having a threaded stem extending backwardly lengthwise of said element, and a nut member threaded on said stem and rotatably mounted in said element.

7. A brake element comprising thrust means at one end of said element having a threaded stem extending backwardly lengthwise of said element, a nut member threaded on said stem, and a transverse opening in said element rotatably receiving the nut and preventing movement of the nut lengthwise of said element.

8. A brake element having a generally cylindrical recess extending lengthwise into one end, and a transverse opening intersecting said recess and adapted to receive a rotatable adjusting member.

In testimony whereof, I have hereunto signed my name.

KENNETH E. LYMAN.